(12) United States Patent
Lester et al.

(10) Patent No.: US 6,421,793 B1
(45) Date of Patent: Jul. 16, 2002

(54) SYSTEM AND METHOD FOR AUTOMATED TESTING OF ELECTRONIC DEVICES

(75) Inventors: Leland Lester; David Iglehart; Stephen J. Swain, all of Austin, TX (US); Marco Becker, Oeding (DE); Charles W. Race, Jr.; Michael D. Perrine, both of Austin, TX (US)

(73) Assignee: Siemens Information and Communication Mobile, LLC, San Diego, CA (US)

( * ) Notice: Subject to any disclaimer, the term of this patent is extended or adjusted under 35 U.S.C. 154(b) by 0 days.

(21) Appl. No.: 09/359,460

(22) Filed: Jul. 22, 1999

(51) Int. Cl.[7] ............................................... G06F 11/00
(52) U.S. Cl. ....................................... 714/37; 714/742
(58) Field of Search .............................. 714/37, 39, 26, 714/27, 30, 31, 33, 734, 741, 742

(56) References Cited

U.S. PATENT DOCUMENTS

| | | | | |
|---|---|---|---|---|
| 565,111 A | * | 7/1896 | McKeeman et al. | ... 395/183.14 |
| 4,517,512 A | * | 5/1985 | Petrich et al. | ............ 324/73 R |
| 5,606,567 A | * | 2/1997 | Agrawal et al. | ............ 371/22.4 |
| 5,633,812 A | * | 5/1997 | Allen et al. | .................. 364/578 |
| 5,758,062 A | * | 5/1998 | McMahon et al. | ...... 395/183.14 |
| 5,923,836 A | * | 7/1999 | Barch et al. | ........... 395/183.09 |
| 5,974,255 A | * | 10/1999 | Gossain et al. | ............. 395/704 |
| 6,011,830 A | * | 1/2000 | Sasin et al. | ..................... 379/1 |
| 6,061,643 A | * | 5/2000 | Walker et al. | .............. 702/123 |
| 6,308,292 B1 | * | 10/2001 | Fusco | ......................... 714/738 |

* cited by examiner

Primary Examiner—Nadeem Iqbal

(57) ABSTRACT

A system and method are disclosed for automated testing of electronic devices. An original test is performed on a model product (24) while the model product (24) is coupled to a test recorder (12). During the test, the model product (24) is manipulated to invoke a desired response. As the test is performed, the manipulations and the desired responses are recorded by the test recorder (12) in an executable format (35). Subsequently, a test analyzer (12) is coupled to a to-be-tested product (24), and the executable recording (35) of the test is played such that the to-be-tested product (24) is manipulated as the model product (24) had been manipulated during the original test. The to-be-tested product's (24) responses to the manipulations are compared against the model product's responses (24). Any difference between the to-be-tested product's (24) responses and the model product's (24) responses are identified.

22 Claims, 12 Drawing Sheets

| com# | on/off | baudrate | parity | databits | stopbits | buffersize | Device on Port | Set Defaults |
|---|---|---|---|---|---|---|---|---|
| #1 | ON / OFF | 10472 | EVEN | 8 | 1 | 2000 | BASE1 | ☐ |
| #2 | ON / OFF | 19200 | NONE | 8 | 1 | 2000 | MU#1 | ☐ |
| #3 | ON / OFF | 0 | NONE | 0 | 0 | 2000 | None | ☐ |
| #4 | ON / OFF | 0 | NONE | 0 | 0 | 2000 | None | ☐ |
| #5 | ON / OFF | 0 | NONE | 0 | 0 | 2000 | None | ☐ |
| #6 | ON / OFF | 0 | NONE | 0 | 0 | 2000 | None | ☐ |
| #7 | ON / OFF | 0 | NONE | 0 | 0 | 2000 | None | ☐ |
| #8 | ON / OFF | 0 | NONE | 0 | 0 | 2000 | None | ☐ |
| #9 | ON / OFF | 0 | NONE | 0 | 0 | 2000 | None | ☐ |
| #10 | ON / OFF | 0 | NONE | 0 | 0 | 2000 | None | ☐ |

OK  CANCEL  Use CTRL H to toggle help

FIG. 6

Predefined Numbers

| Phone Number 0 | Base 1 PIN 1 | Mobile 1 PIN 1 | Mobile 1 PIN 2 |
|---|---|---|---|
| Phone Number 1 | Base 1 PIN 2 | Mobile 2 PIN 1 | Mobile 2 PIN 2 |
| Phone Number 2 | Base 2 PIN 1 | Mobile 3 PIN 1 | Mobile 3 PIN 2 |
| Phone Number 3 | Base 2 PIN 2 | Mobile 4 PIN 1 | Mobile 4 PIN 2 |
| Phone Number 4 | | Mobile 5 PIN 1 | Mobile 5 PIN 2 |
| Phone Number 5 | | Mobile 6 PIN 1 | Mobile 6 PIN 2 |
| Phone Number 6 | | Mobile 7 PIN 1 | Mobile 7 PIN 2 |
| Phone Number 7 | | Mobile 8 PIN 1 | Mobile 8 PIN 2 |
| Phone Number 8 | | | |
| Phone Number 9 | | | |

Use Settings | QUIT | Use CTRL H to toggle help

FIG. 7

SYSTEM AND METHOD FOR AUTOMATED TESTING OF ELECTRONIC DEVICES

TECHNICAL FIELD OF THE INVENTION

The present invention relates in general to the field of automated testing, and more specifically to a system and method for automated testing of electronic devices.

BACKGROUND OF THE INVENTION

Product development is an ongoing process in most industries. In the current climate of rapidly advancing technology, many of these industries are pouring more and more resources into the development of new products. The goal, however, is not merely to develop new products, but rather, to develop better products. As such, organizations involved in product development subject the developmental products to a barrage of tests. In many cases, these tests are repetitively performed to ensure the durability of the developmental product.

As much as any other industry, the electronics industry is committed to the thorough testing of new products. Unfortunately, testing products with embedded microprocessor chips presents unique challenges. Aside from testing the durability of the product, a developer must debug the embedded software. The debugging process is especially difficult when the product is a man-machine interface (MMI) product, a product with an intended use involving man-machine interfaces.

To test the embedded software of MMI products (e.g., telephones, keyboards, etc.), the product developer must simulate the interfaces of man and machine. With regard to a telephone, for example, the developmental product may need to be manipulated in any number of ways. Each of the simulated manipulations emulates the manipulations the developmental product is likely to encounter when generally available. Moreover, these many manipulations need to be repetitively performed.

There are two types of conventional testing methods for MMI products: manual testing and automated testing. Manual testing requires an individual to manipulate a to-be-tested product and to compare its response to the desired design response. The individual performs the test repetitively. While the manual testing method allows a product development group considerable flexibility when altering the manipulations and responses to be tested, the manual approach to testing is expensive, unreliable and an inefficient use of human resources.

The conventional alternative to manual testing is automated testing with a specifically developed and manually written software program. While the automated testing is usually more reliable than the manual testing, it is not always less expensive. The programming costs associated with the development of an automated testing program are substantial. The software's programmer must be trained in the programming language and must be familiar with the language's syntax requirements. Moreover, if the product development group desires a new test or series of tests, the programmer must write a second program. The cost of preparing the second automated test program may be as high, if not higher, than the cost of preparing the first program.

SUMMARY OF THE INVENTION

In accordance with the present invention, a system and method are disclosed for automated testing of electronic devices. The system and method disclosed provide advantages over previously developed testing systems.

According to one aspect of the present invention, a system is provided for automated testing of an electronic device. Within the system is a test recorder which can be coupled to a model product via a communication link. The test recorder generates a test record of an original test while the original test is performed. The test record includes a manipulation entry representing an original manipulation signal and a model response entry representing an original response signal. The system also includes a test analyzer that can play the manipulation entry of the test record. The test analyzer can be coupled to a to-be-tested product via a test link. When coupled, the test analyzer can play the manipulation entry of the test record such that the to-be-tested product receives a test signal that simulates on the to-be-tested product the original manipulation signal of the original test. This simulation causes the to-be-tested product to respond, and the test response signal generated by this response is communicated back to the test analyzer. The test analyzer then compares the test response signal against the model response entry and identifies a test response that differs from the model response entry.

In one particular embodiment, the model product, upon which the original manipulations are performed, is a virtual product. Using LabView, or some other visual programming language, a virtual product is generated that replicates the developmental product. A user interface then allows a user to manipulate the virtual product as if it were an actual product. Again, the manipulation signals and the response signals are recorded by the test recorder. A virtual product may also be used in conjunction with a model product. That is to say, a user could manipulate an actual model product, which is connected to the user interface, by manipulating the virtual product. The virtual manipulation would generate the to-be-recorded manipulation signal which would be sent to the model product. In response to the manipulation signal, the model product would generate the to-be-recorded response signal.

In another embodiment, the test recorder records the test record as a text document script file. Once recorded, the test recorder may allow a user to edit the test record. An embodiment of the present system may also allow one recorded a script file to call another recorded script file. To facilitate this calling feature, a script file hierarchy may be employed.

In a further embodiment, the model product and the to-be-tested product may be cordless telephones or mobile units. In this embodiment, the test link may include an RS232 to $I^2C$ converter, and the original test may include the leaving of a voice mail message using a coded series of dual tone multiple frequency (DTMF) tones.

In each of the above-discussed embodiments, the test analyzer may be operable to automatically repeat a test and record a plurality of additional time. This operability allows a product development group to repetitively test a product with minimal oversight. The test analyzer may also allow a user to control the playing of the record. For example, the user may have the test analyzer stop or pause play each time it identifies a test response signal that differs from a model product response signal.

In addition, the test link may be operable to allow a user to couple the test analyzer to a plurality of to-be-tested products such that a single test analyzer may test a plurality of products with each playing of the test record. To facilitate this multiple coupling capacity, the system can employ an independent driver capable of managing multiple tasks. The driver's responsibilities would include handling data flow between the test analyzer and the to-be-tested products. To facilitate the data handling, the driver could employ a two-dimensional array with a row for each to-be-tested product and columns for various signal data. The two-dimensional array could also include an additional column for handshakes. As such, the driver would be operable to manage the recording of manipulation and response signals. The driver, when polling through the array, would read the handshake column of a given row and determine whether or not the signal of the to-be-tested product corresponding to the given row was to be recorded. By using the handshake column, the system knows if the driver is busy or if it is ready for the next recording. The driver might also employ a second array of one dimension. Again, the rows could represent the to-be-tested products. The driver could use this second array when the system seeks to simulate the manipulation of a to-be-tested product. As the driver polls through the array, the driver will send the manipulation signal referenced in a polled field. Once the signal has been sent, the field is labeled as empty, and the driver continues polling. In so doing, a handshake is performed in the referencing field.

A technical advantage of the present invention is the reduction of human time costs. Whereas before a person would physically manipulate a single product and compare its response to the model response, the automated testing system can test a plurality of products at one time without human oversight. Even when compared against conventional automated testing, the present automated testing system represents significant time savings. Physically performing an original product test once generates the test record of the present invention. As such, the need for experienced programmers disappears, as does the time associated with writing the testing program. Moreover, if a product development group decides to run additional or different tests on a to-be-tested product, the time required to prepare the second test record is little more than the time required to run the new test, because running the new test on a model product generates the test record needed to test the to-be-tested products.

Another technical advantage of the present invention is improved testing reliability. The ease and speed of preparing the test record of the present automated test system allows product development groups to use automated testing in place of manual testing. In the past, automated testing was used sparingly, because of the costs associated with writing the test program. As a result, manual testing is the most common form of testing. Unfortunately, manual testing is not always as reliable as automated testing. The present invention makes automated testing easy enough and inexpensive enough to supplant much of the manual testing being employed today. This, in turn, may help improve the reliability of developmental product testing. It may also help reduce the significant costs associated with developmental product testing.

Though much of this summary references developmental products, the automated testing system would allow for compliance testing of production products. Additional technical advantages should be readily apparent from the drawings and description.

BRIEF DESCRIPTION OF THE DRAWINGS

A more complete understanding of the present invention and advantages thereof may be acquired by referring to the following description taken in conjunction with the accompanying drawings in which like reference numbers indicate like features and wherein:

FIG. 6 illustrates an exemplary modify communication port assignment screen;

FIG. 7 illustrates an exemplary modify pre-defined number screen;

DETAILED DESCRIPTION OF THE INVENTION

Embodiments of the present invention and its advantages are best understood by referring to FIGS. 1 through 15 of the drawings, like numerals being used for like and corresponding parts on the various drawings.

Figure 1:
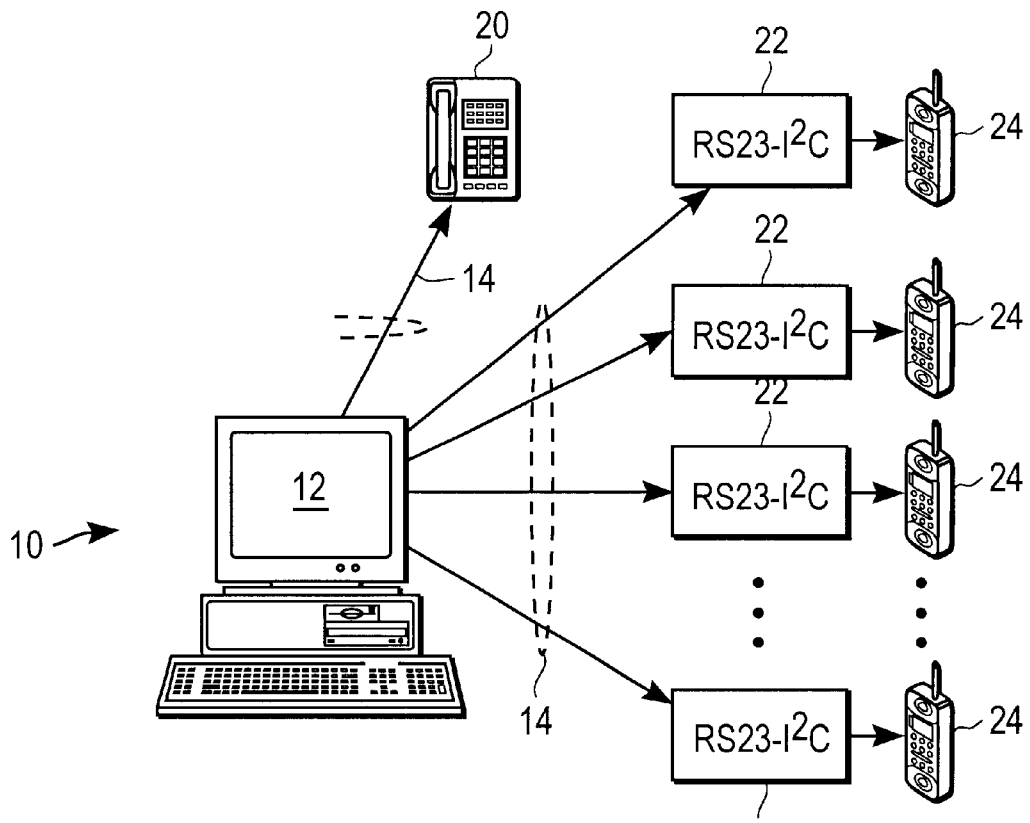
FIG. 1 illustrates a system for the automated testing of telephones in accordance with the teachings of the present invention.

FIG. 1 illustrates a system for automated testing of telephones in accordance with the teachings of the present invention. The system 10 includes a test computer 12 having a plurality of serial port links 14 to connect to various components. Test computer 12 is connected by serial links 14 to one or more base stations 20. Base station 20 (or base station phones), in one embodiment, is a base station for a cordless phone system which includes a plurality of mobile units 24 (also known as mobile phones). Test computer 12 is coupled also via serial link 14 to a plurality of RS232 to $I^2C$ interfaces 22 which then connect to mobile units 24. The RS232 to $I^2C$ interface is operable to allow test computer 12 to connect to mobile units 24. Mobile units 24 are operable to interact with base station 20 such that they share the outgoing telephone lines with base station 20. System 10 is the programming system to be used to program and automatically test the mobile units 24 as well as base station 20

Test computer 12, in one embodiment, operates as a test recorder. While performing tests on mobile unit 24 or base station 20 coupled to test computer 12, test computer 12 stores a record of the test. The recorded test can then be placed back to test other mobile units 24 or base stations. In another embodiment, test computer 12 can display a graphical representation of mobile units 24 or base stations 20. Manipulation of the graphical interface can then be done to generate test scripts that can later be run on test computer 12 to test mobile units 24 or base stations 20. Manipulation of the graphical interface can directly test mobile units 24 or base stations 20. Test computer 12 can also operate as a test analyzer. A prerecorded test script can be run on test computer 12 when it is attached to a to-be-tested mobile unit 24 or other device. As the script is executed, test computer 12 manipulates the to-be-tested product and compares the results with parameters stored in the script. Thus, test computer 12 operates as both a test recorder and a test analyzer.

Although the above example was drawn to the testing of base stations (20) and mobile units (24) of phones, test computer 12 can act as a test recorder and analyzer in conjunction with other electronic products and devices.

Figure 2:
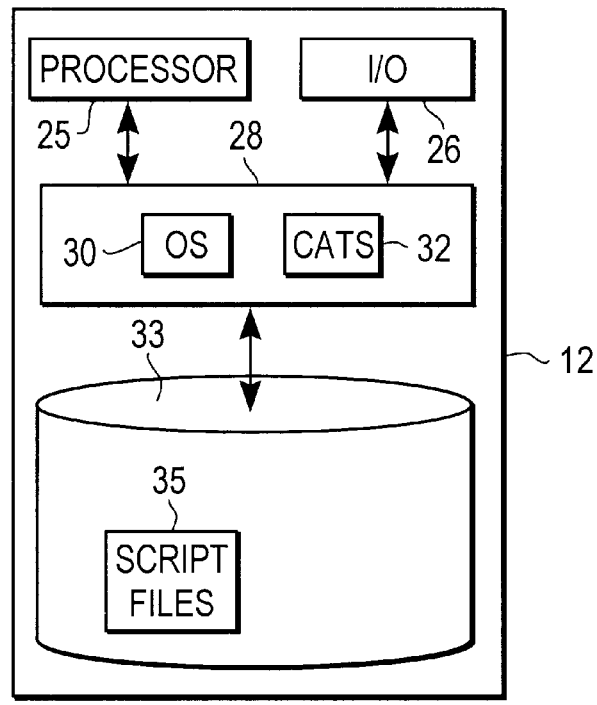
FIG. 2 is a block diagram of the test computer.

FIG. 2 is a block diagram illustrating test computer 12 in more detail. Test computer 12 may be implemented using a computer that includes a processor 25, such as an INTEL or MOTOROLA microprocessor, a memory 28, such as a random access memory ("RAM") and/or read only memory ("ROM"), various I/O devices 26 (such as serial RS232 outputs), and a mass storage device 33, such as a hard disk drive or optical drives used to store program files such as script files 35. I/O devices 26 may be any peripheral that allows data to be exchanged with test computer 12 and may include such things as a keyboard, a pointing device, such as a mouse, a monitor, a graphics tablet, a modem, and the like. Test computer 12 may be implemented using a personal computer operating under the control of an operating system such as WINDOWS 3.1, WINDOWS 95/98, WINDOWS NT, OS/2, DOS, UNIX, LINUX or other operating systems.

Test computer 12 includes an operating system 30 shown stored in memory 28. Operating system 30 is a master control program that manages and controls the internal functions and operations of client computer 12. Operating system 30 must also acknowledge and respond to requests from the devices of I/O devices 26 and to mass storage device 33. Operating system 30 may be implemented using virtually any operating system, such as those mentioned above.

Operating system 30, a computer aided testing system program 32 (CATS), and script files 35 may be stored in mass storage device 33 and provided to memory 28. Mass storage device 33 may be a hard disk drive commonly found and used in personal computers. Operating system 30 is preferably loaded into memory 28 during initialization or boot-up of test computer 12. A graphical User Interface may then be loaded into memory 28 either automatically during initialization or after being selected by a user. The user of test computer 12 may include non-technical personnel.

Processor 25, under the control of operating system 30, is used to retrieve, process, store, and display data. Processor 25 communicates control, address, and data signals with operating system 30 and with other components of test computer 12 through a system bus. Processor 25 may include an arithmetic logic unit used to assist processor 25 in performing mathematical operations. Processor 25 interprets and executes instructions that have been fetched or retrieved from memory 28, such as from CATS 32, and may be implemented as a single integrated circuit or as a combination of integrated circuits.

CATS 32 is an application program and is shown loaded into memory 28 along with operating system 30. The instructions of CATS 32 are provided to processor 25 which is used to execute the instructions provided from memory 28. CATS 32 allows a user of client computer 12 to record, run and edit script files 35 as well as directly test base station 20 and mobile units 24.

Script files 35 are saved as text documents. Each line in a file is a command, with the first word being the command and any additional words interpreted as parameters of that command. These words are separated by blank spaces. A semicolon can be used to separate commands from comments. This means that after a semicolon, every word behind that semicolon simply comments upon the preceding information and its not interpreted by the interpreter as a command or parameter. The syntax for the script file 35 is dividing the two different types of commands. The first type of commands manipulates the connected phones and the second type of commands control the execution of the script file 35. The commands that manipulate the function of the connected phones are "PRESS", "DISPLAY". PRESS simulates a keystroke on a phone and DISPLAY reads the display of a phone and compares this data with the reference in the script file 35. The reference in the script file 35 would simply be the parameter for the display command.

Commands that control the execution of the script file 35 include "STOP", "PAUSE", "WAIT", "BREAKPOINT", "IF ERROR", "MANUAL", "SET PATH", "CALL:", AND "RETURN". "STOP" aborts the execution of a script file 35 "PAUSE" aborts the execution of the script file 35 until a user presses a button and "WAIT" suspends the execution of the script file 35 for a certain number of time determined by the parameter for "WAIT". "BREAKPOINT" is a command that allows users to start and stop the debugger with a command in a script file 35. It is helpful to trace errors in the program in the script file 35 itself. "IF ERROR" is a command that allows the script file 35 to branch to another set of instructions depending on whether or not the last command passed or failed. The "MANUAL" command brings up a message box with information or instruction for the user. The "SET PATH" and "CALL:" command work together to create a script file 35 hierarchy. The "SET PATH" command allows the user to point to a directory with subscript files, also known as script file 35 subroutines, and the "CALL:" command starts the execution of a subscript file in this directory. Finally, the "RETURN" command starts execution of the script file 35 from the beginning.

FIGS. 3 through 12 and the accompanying descriptions illustrate and describe an exemplary system for the CATS program.

Figure 3:
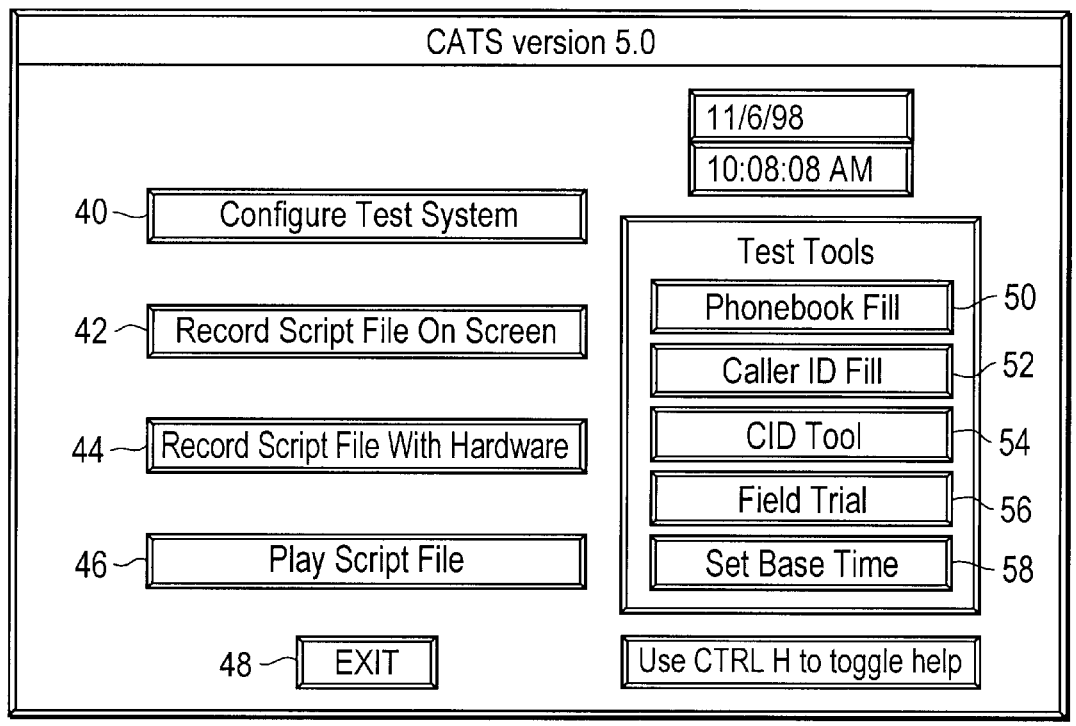
FIG. 3 illustrates an exemplary main menu screen.

FIG. 3 illustrates an exemplary main menu screen in accordance with the teaching of the present invention. Upon initiation of CATS program 32 this screen would be the initial screen. The screen offers the user five choices: configure test system 40, record a script file 35 on screen 42, record script files with hardware 44, play script file 35 46, and exit 48. Also included are test tools. These include phone book fill 50, caller I.D. fill 52, caller I.D. tool 54, field trial 56, and set base time 58.

If a user selects configure test system 40, that brings up a test system configuration panel. This option allows a user to configure the settings for the CATS system. These settings include the performance parameters for the serial port, the hardware configuration of the CATS systems, such as types of phones that are connected to each port, and pre-defined number variables. Configuration test system 40 is discussed in great detail in conjunction with FIG. 4.

Selecting record script file 42 brings up an on-screen recorder panel. This option allows the user to record script files while controlling the attached phones by using the mouse to click on screen controls. This functionality is discussed further in conjunction with FIG. 8.

Selecting record script file with hardware 44 brings up a hardware record panel. This option allows the user to record script files while controlling the attached phones by pressing buttons on the actual phones. This functionality is discussed further in conjunction with FIG. 9.

Selecting play script file 46 brings up a play panel. This option allows the user to execute a pre-recorded script. This is discussed further in conjunction with FIG. 10.

Choosing phone book fill 50 brings up the phone book fill panel. This option is used to fill the mobile base phone with phone book information and is discussed further in conjunction with FIG. 11.

Selecting Caller I.D. fill 52 brings up the caller I.D. fill panel. This option is used to send user defined caller I.D. information to the base station in order to test caller I.D. information capabilities. This is discussed in conjunction with FIG. 12.

Selecting caller I.D. tool 54 brings up the caller I.D. tool panel. This tool gives users control of the TLS5 and the TLE telephone line simulators.

Selecting field trial 56 brings up the field trial tool panel. This saves the current state, directories and speed dial keys of mobile units 24 and base station 20 automatically. Additionally, it will reprogram mobile and base directory entries from files generated during the save.

Selecting set base time 58 brings up a set base time panel. This can be used to set the current date and time on each of the base phones.

Figure 4:
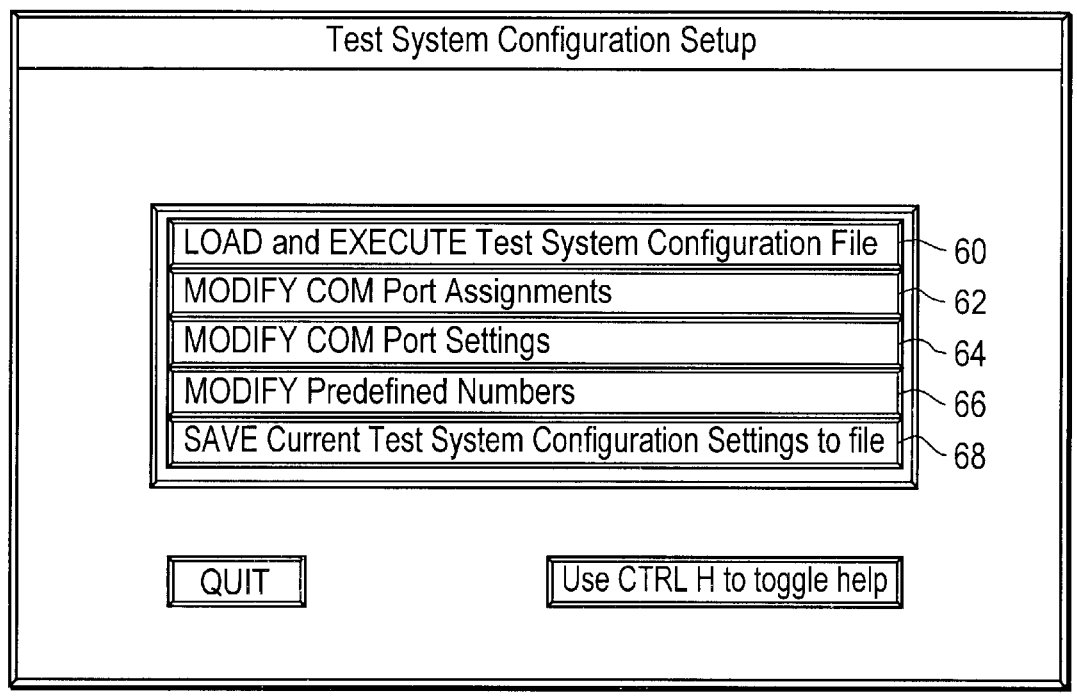
FIG. 4 illustrates a test system configuration setup screen.

FIG. 4 illustrates an exemplary test system configuration setup screen in accordance with the teachings of the present invention. Test system configuration setup screen is reached by selecting-configure test system 40 from the main menu as discussed in conjunction with FIG. 3. Once test system configuration setup screen is displayed, it offers the user five choices. These are: load and execute test system configuration file 60, modify communication port assignments 62, modify communication port settings 64, modify prefixed numbers 66, and save current test systems configuration settings to a file 68.

Choosing. load and execute test system configuration file 60 allows the user to select an existing configuration file. The settings stored in the configuration files are loaded into the CATS program for review or update and these settings are used by CATS.

Selecting modify communication port assignment 62 brings up the communication port assignment panel. At the communication port assignment panel, the user can configure the communication port (RS232) assignments used by CATS. The assignments define what type of phone, if any, is attached to each communication port. This functionality is discussed further in conjunction with FIG. 5.

Selecting modify communication port settings 64 brings up the communication port setting panel. At the communication port settings panel, the user can configure the communication port settings used by CATS. This functionality is discussed further in conjunction with FIG. 6.

Selecting modify pre-defined numbers 66 brings up the pre-defined numbers panel. At this panel, numbers can be assigned to variables for use in test scripts. This functionality is discussed in conjunction with FIG. 7.

Selecting save current test system configurations settings to file 68 saves the current system settings to a user specified configuration file. This configuration file can be loaded later to automatically set all CATS configuration settings. A default configuration file, for example, a file named default cfg, in the CATS root directory is automatically loaded when CATS is initiated. This default configuration file can be modified as desired, or new configuration files can be created.

Figure 5:
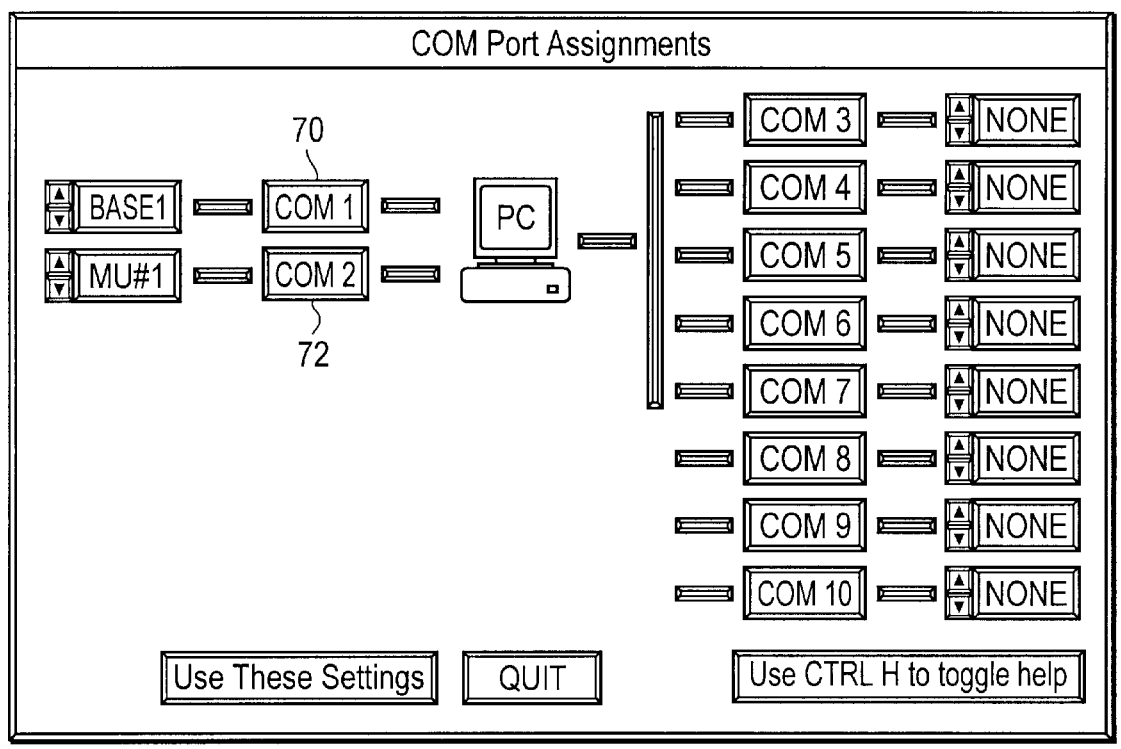
FIG. 5 illustrates an exemplary modify a communication port screen.

FIG. 5 illustrates an exemplary screen for modifying communication port assignments 62 in accordance with the teachings of the present invention. The communication port assignment screen allows the user to define what type of phone is connected to each communication port. The screen displays each communication port in a box where a user can scroll up or down to determine what type of phone is connected to that communication port. The variable phone options include Rolm, Base Station, Mobile, Modem, TLE Phone Line Simulator, TLS5 Phone Line Simulator, or none, indicating no phones attached. In FIG. 6, communication port 1 70 is assigned to a base station and communication port 2 72 is assigned to mobile unit 1. The other communication ports are unassigned.

FIG. 6 illustrates a modify communication port settings screen in accordance with the teachings of the present invention. For each of the ten communication ports parameters such as communication port on or off, baud rate, parity, number of data bits, number of stop bits and buffer size are a variable of each communication port for the user to change. If communication port on or off is selected, that determines whether or not the communication port is on or off. Baud rate determines the speed of the port. Parity can be even, odd, or none. Data bits determines the number of data bits. Stop bits determine the number of stop bits. Buffer size determines the size of temporary input buffers in terms of bites. Set defaults allows the user to select the typical parameters used based on the type of phone attached to that communication port. This screen provides a way for a user to change parameters of communication ports by simply selecting and changing the settings. In FIG. 6, line 74 shows that communication port number 1 is toggled to the on position. Reading across the line shows that the baud rate is 10472, parity is even, data bits is set to 8, stop bits are set to one and the device attached to the port is the base unit. Line 76 shows that port is on with a baud rate of 19,200, no parity set, a data bit size of 8, one stop bit and an indication that a mobile unit 1 is attached to communication port 2.

FIG. 7 illustrates an exemplary modify pre-defined number screen. In this screen, a user can set up phone numbers that can be referred as variables in scripts. Then when the variable is encountered during the playback of the script, a phone number is subject to that variable. For example, phone number 1 can be a variable and the actual phone number, such as 202-555-1757, would be the number assigned to that variable. In this manner, pre-defined numbers can be used across different scripts in order to make it portable.

Figure 8:
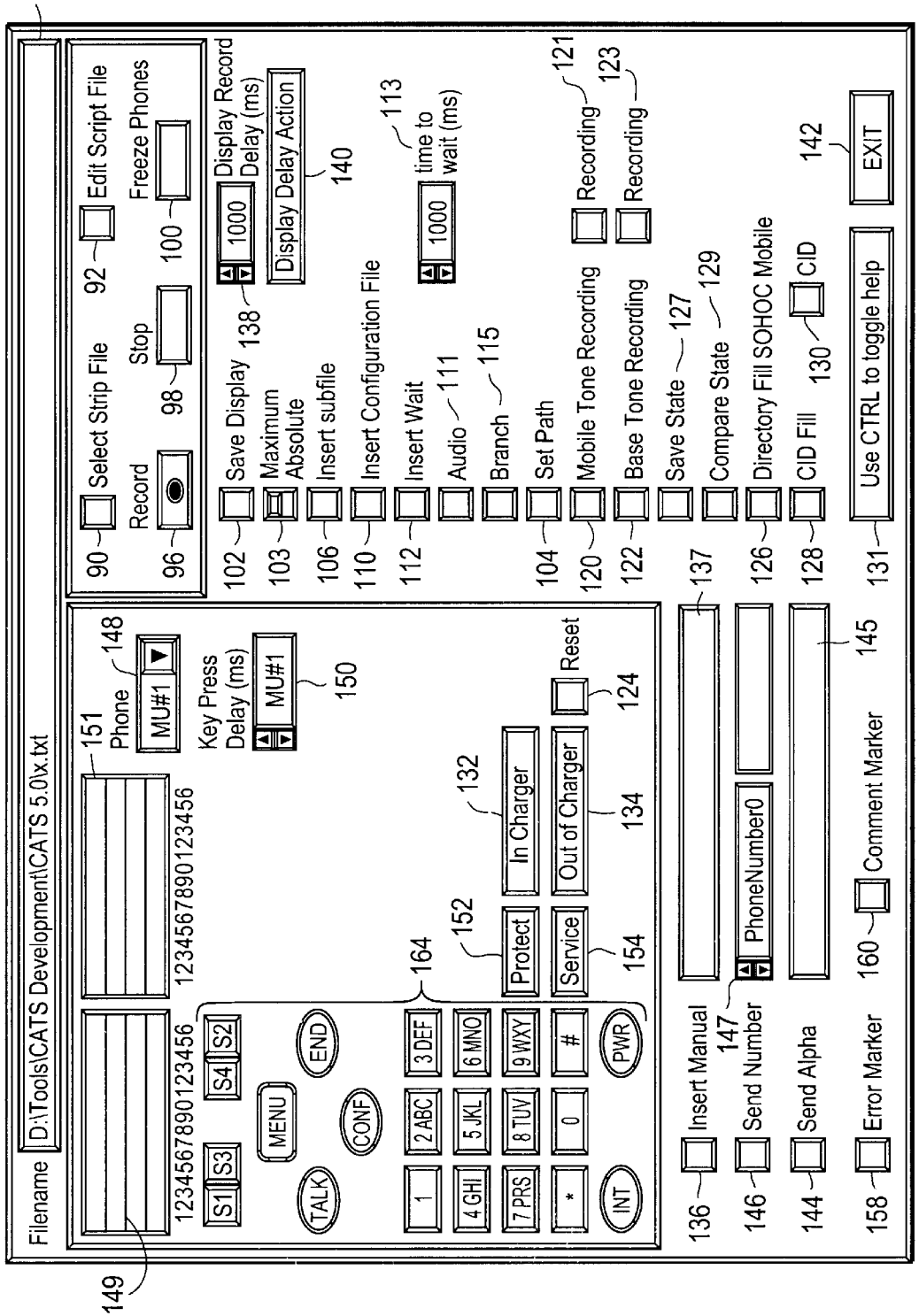
FIG. 8 illustrates an exemplary on-screen record screen.

FIG. 8 illustrates an exemplary on-screen record screen in accordance with the teaching of the present invention. The on-screen record screen provides for remote control of telephone hardware and the capability to automatically record test steps to test scripts 35 for later playback and automated testing. The on-screen recorder allows for the generation of script files where the recording action is performed on the screen and saved as a file. The screen shows a graphical representation of the buttons and displays for the selected phone. Thus, the display will differ depending on the type of phone selected. The selected phone is controlled by clicking a mouse on the desired buttons. When a button is selected or clicked on, a command is sent from the CATS system to the selected phone telling the phone which button has been selected. Thus, selecting or clicking the menu button on the screen has the same effect as pressing the menu button on the phone. In addition, when recording is activated, the key press command will automatically be appended to the script file 35 as keys are selected on the screen, automatically generating a script file 35.

This screen has numerous buttons for different functionalities. Among them are select script file 90 button. This selects the file where the script will be recorded. Edit script file 92 button invokes an editor viewer to edit the current test script when chosen. If a script file 35 has already been selected, the editor automatically loads that file for editing. File name 94 displays the file name and path of the current script file 35. Record button 96 starts recording test actions to the script file 35 when selected. Stop button 98 stops recording test actions in the script file 35. Freeze phone button 100 freezes the telephones in the current state. Save display button 102 saves the display information to the script file 35. The display is the display on the selected phone, reproduced as screen display 149. Once the screen is updated, then it can be saved by pressing the save display button 102. When a script file 35 is executed, the displayed information is collected and compared to the data recorded in the script file 35 to see if there are any errors. A set path button 104 defines the path for subroutines that will be used in the current script file 35. An insert subtile button 106 inserts a call to another existing script file 35 into the current script file 35 and execute the inserted file. A flashing indicator is displayed when the called script file 35 is executing. When the indicator disappears, the called script file 35 has finished execution and recording continues.

Insert configuration file button 110 inserts a call to an existing configuration file into the current script file 35 and executes that configuration file. When resulting script file 35 is executed, the configuration file will also be executed. Insert wait button 112 inserts a wait statement into the current file. When script file 35 is executed, and the wait statement is encountered, the execution of script file 35 delays for a specified amount of time and then continues. The time is set in time to wait box 113. An if error button inserts an if error statement into script file 35. If an error is encountered in playback, then the next line of script file 35 is executed. Otherwise, the next line is ignored and a subsequent line is executed. A repeat button inserts a repeat command into script file 35. If a repeat command is encountered during playback, the current script is started over from the beginning and repeated. Branch button 115 inserts a branch statement into script file 35. When encounter during playback branch sends the execution of the test script to another part of the script. Audio button 111 is selected to test the answering device and voice connection of the base units and mobile units. The answering device is tested by leaving a message ID consisting of dual tone multi frequency (DTMF) tones and leaving a voice mail message by playing computer stored sound files. Then the message can be reread and analyzed by reading back the stored ID and time the length of the message to ensure it matches what was stored. The voice connection between channels can be checked by sending out a tone for a fixed length of time (such as a 1 KHz tone for 500 ms). The test subroutine stops after the tone is detected or if the tone is not detected after a given amount of time.

Mobile tone recording button 120 allows tones for selected mobile units to be recorded into script file 35. Recording button 121 lights when mobile tone recording 120 is selected. Base tone recording button 122 allows the tones for the selected base station to record into script file 35. Recording button 123 lights when base tone recording button 122 is selected. Reset button 124 resets the serial interface of the mobile units. This needs to happen when a mobile unit is turned on or off. This can be done in script file or manually by hitting the reset button. Directory fill button 126 invokes a directory fill function and records the action in the script file 35. The directory fill function takes a text file containing a list of names and numbers. This file is an ASCII text file using the format of <last name> space <first name> space <phone number> return. Caller I.D. fill button 128 invokes a caller I.D. fill function when selected and records the action in the script file 35. The caller ID function calls an ascii text file containing a list of names and phone numbers using the same format as the directory fill function. The caller ID function configures a telephone line simulator (TLS) with each name and phone number one at a time. After the TLS is configured with a name a call is placed to the phone under test. This call places the caller ID information into the phone under test. A caller I.D. button 130 invokes the caller I.D. tool and records the action in the script file 35.

In charger button 132, when selected, sends a command to the mobile unit instructing to act as if it was in the charger stand. This can be contrasted with out of charger button 134, which sends a command to the mobile unit instructing it to act as if it were out of the charger stand. Insert manual button 136 allows the operator to perform a manual operation when a script file 35 executes. When the insert manual button is pressed, a manual command is written into the script file 35 along with the text that was entered. When the script is executed and the manual command is encountered, the text given will be displayed to the user in a pop-up message and the script execution will pause at that point. After performing the manual operation detailed in the message, the operator acknowledges the manual message and execution of the script file 35 will continue.

Display record delay 138 sets the delay, in terms of microseconds, that the CATS system will wait for new display data to match current data in the script. Display delay action switch 140 allows the user to switch between display delay action being a maximum or absolute. The maximum setting sets the wait argument at the end of the display command line in the script file 35. The absolute option does not set the wait argument. If absolute was selected during recording, then during playback, when a display command is encountered, CATS will first delay for the recorded display delay time and then check for a display error. If the observed display matches the recorded display, there is no error and execution continues. Otherwise, an error is generated. If the maximum option was used in recording, then during playback CATS will monitor the phone for no more than the display record delay time. If the expected display is received before the time out, the command passes and the next command is executed. If time expires before the expected display is received from the phone, an error is generated. The display is always checked at least once, regardless of the time out period specified.

Exit button 142 exits record on screen panel and returns to the CATS main menu. Send alpha button 144 sends the alpha text that is contained in field 145 to the phone identified in field 148. Before send alpha button 144 is selected, the user would place the desired alpha characters into field 145 by selecting field 145 and typing keys on the PC's keyboard Send number button 146 allows the user to send keystrokes of a line of predefined numbers. Phone button 148, when selected, chooses one of the phones from the list of the phones that are attached to the CATS system. When selected, all commands are sent to that phone. Key press delay control 150 allows the user to enter the desired delay to be used between key presses during playback mode. During script file 35 playback, CATS waits for the specified delay recorded with each key press command, and then sends a keystroke to the phone. Protect button 152 is used when the phone type is mobile unit 24. This button sends a command to mobile unit 24 to toggle the keyboard protect mode on. Service button 154 is used to select a mobile unit 24 to enter its service mode. A telephone display indicator is updated to reflect the display of the selected phone. On the monitor screen, the display character data for the phone associated with the CATS system is shown. For a mobile unit 24, two displays are used. One display, the screen display 149, on the left shows the text that a user looking at the mobile unit 24 would see. On the right side, attribute screen 151 shows the attributes for each character. Attributes can be normal, inverse, blink or cursor. Error marker button 158 inserts a comment into the script file 35 to note a known error. Finally, comment marker button 160 is used to insert a comment into the script file 35. Keypad 164 is the displayed keypad for the type of phone (mobile or base) current selected. Choosing keys on keypad 164 will cause the same keys to be operated on the actual phone attached to CATS. If record 96 is operating, the keystrokes are recorded as script files 35.

Figure 9:
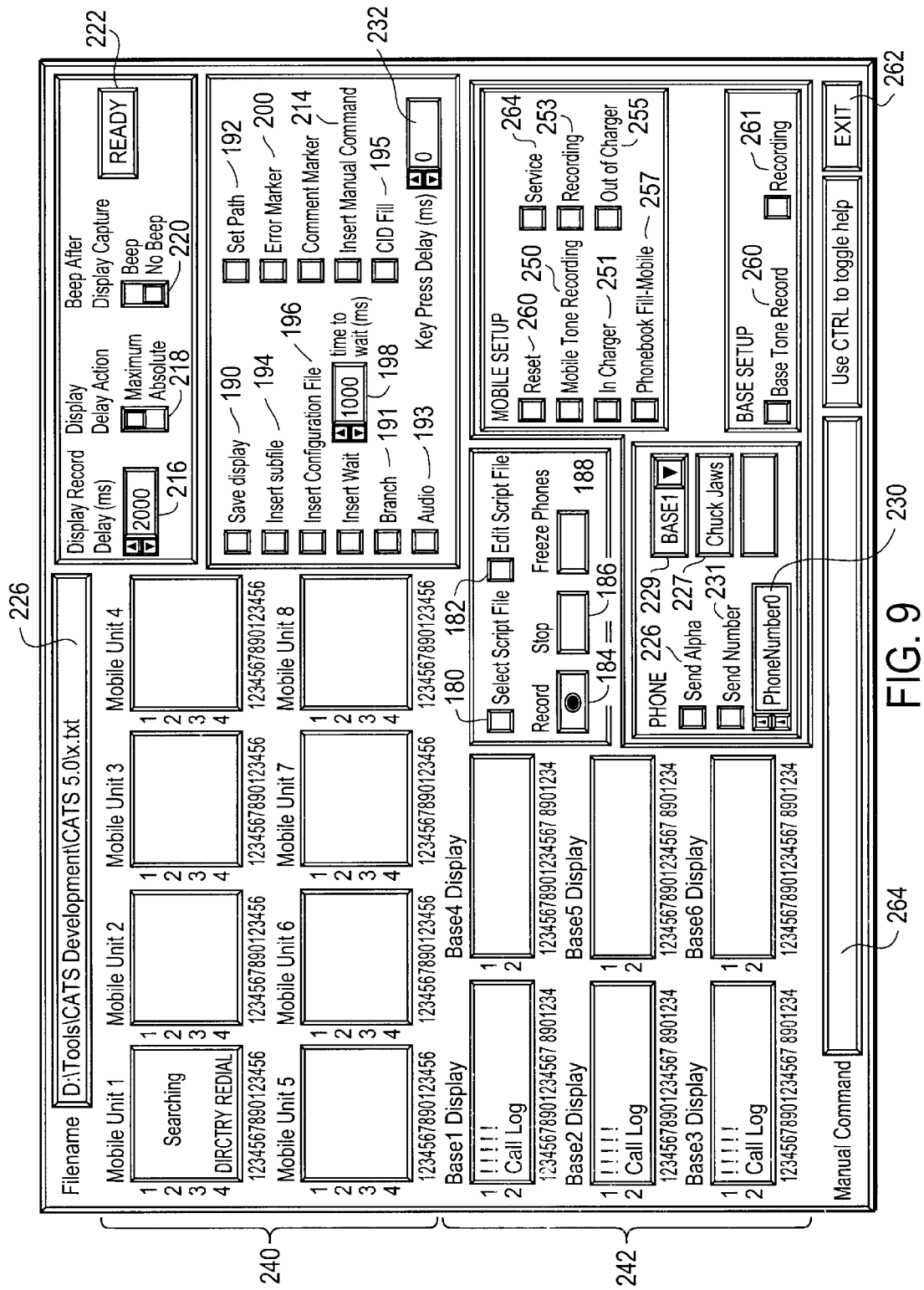
FIG. 9 illustrates an exemplary record with hardware screen.

FIG. 9 illustrates an exemplary record with hardware screen in accordance with the teaching of the present invention. This screen is used when programming is done directly on a mobile or base phone and not done on the computer screen.

Select script file 35 button 180 allows the user to select the file where the script will be recorded. Edit Script File button 182 invokes an editor to view or edit the current test script file 35. If a script file 35 had been selected, the editor automatically loads that file for editing. File Name indicator 183 shows the filename and path for the current script file 35. Record button 184 begins recording test actions to the script file 35. Stop button 186 stops the recording of test actions to the script file 35.

Freeze Phones button 188 freezes the telephones in there current state. For the mobile phones, this button periodically sends the ON/OFF key command to the mobile telephone. This has the effect of maintaining the current state of the mobile. Naturally, if the mobile were in the idle state, this button has the effect of repeatedly turning the phone on and off.

Save Display button 190 saves the display information to the script file 35. A user would wait until the display completes its update to the screen, and then press this button. When the script file 35 is executed, the display information will be collected and compared to the data recorded in the script file 35. Set Path button 192 defines the path for subroutines that will be used in the current script file 35. Insert subfile 194 button inserts a call to another existing script file 35 into the current script file 35. The called script file 35 is then executed. While this script file 35 is executing, a flashing indicator will be displayed. When the indicator disappears, the script file 35 has finished execution, and recording can continue. The Play function finds the subfile by appending the subfile name to the subfile path defined by the Set Path command. Insert Configuration File button 196 inserts a call to an existing configuration file into the current script file 35. When the script file 35 is executed, the configuration file will also be executed. The CONFIGURE SYSTEM option from the CATS front panel can be used to generate configuration files. Insert Wait Button 198 inserts a WAIT statement in the current script file 35. When the script file 35 is executed (using the Play function described later) and the WAIT statement is encountered, the execution of the script file 35 delays for the specified amount of time and then continues. Use the "time to wait" control to set the time you wish for the script file 35 to delay during playback. Error Marker button 200 inserts an IF ERROR statement into the script file 35. If an error is encountered during playback, the next line of the script file 35 is executed. Otherwise, the next line is ignored. A REPEAT command can be placed into the script file 35. If a REPEAT command is encountered during play back, the script file 35 is started over from the beginning.

Since the tones for each phone are continuously collected in a buffer as CATS runs, a Mobile Tone recording 250 button and base tone recording button 260 are provided to clear the tone buffer for the selected phone. During execution of the script file 35, the collected tones are compared to the tones recorded in the script file 35.

Reset button 210 is provided to reset the serial interface with the mobile units. This is needed because after the mobiles units are turned off and then on, the serial interface to them must be reestablished.

Sometimes it is necessary for the operator to perform a manual operation while a script file 35 executes. The text that is needed to be displayed to the test operator during the test is entered using the Insert Manual command button 214. Selecting Insert Manual command button 214 writes the manual command to the script file 35 along with the text that you entered. When the script file 35 is executed, and the Manual command is encountered, the text entered will be displayed to the user in a pop up message and the script execution will pause at that point. After performing the manual operation, the operator acknowledges the MANUAL pop up message, and script file 35 execution continues. Audio button 193 operates as in FIG. 8.

If a display changes while record is active, the displays are automatically written to the script file 35. Display Record Delay control 216 sets the delay, in milliseconds, that CATS will wait before recording any new display data. To be recorded, a display on at least one connected phone must change, and then all phone displays must remain unchanged for the display record delay time. Then, the display for all phones are recorded. Otherwise, no displays are recorded. Display Delay Action switch 218 selects between a display delay action of either Maximum, or Absolute. The Maximum option sets the WAIT argument at the end of the DISPLAY command line in the script file. The Absolute option does not set the WAIT argument. If Absolute was selected during recording, then during playback, when a DISPLAY command is encountered, CATS will first delay for the full display record delay time and then check for expected display. If the observed display matches the recorded display, there is no error and execution continues. Otherwise and error is generated. If the Maximum option was used during recording, then during playback CATS will monitor the phone for no more than the Display Record Delay time. If the expected display is received before the timeout, the command passes and the next command is executed. If timeout expires before the expected display is received from the phone, an error condition is made. The display is always checked at least once, regardless of the timeout period specified. The Maximum and Absolute setting can optionally be selected within a script file 35.

Beep After Display Capture switch 220 elects whether CATS will generate a tone after it has recorded new display data. Ready indicator is green when CATS is ready for new inputs. Ready indicator 222 is red when CATS has detected new display data and is waiting for the display record to expire. When the indicator turns green again, the data will be stored in the script file 35. Exit button 262 exits the Record on Screen panel and returns to the CATS Main Menu, shown as FIG. 3.

Send Alpha button 226 allows the user to enter alpha text to be sent to the phone in the text field. Pressing Send Alpha button 226 sends the key stroke combinations to the phone for the text entered in text box 227. Selecting Phone number button 230 chooses a phone number from a list of phone numbers represented as variables. Selection send number button 231 sends the number. Phone button 229 selects which of the base or mobile phones that is being used. All commands will be sent to this phone. Key Press Delay control 232 selects the desired delay to be used between key presses during playback mode. During script file 35 playback, CATS waits for the specified delay recorded with each key press command, and then sends the key stroke command to the phone. Service button is displayed when the phone type is mobile. This button sends a command to the mobile units to enter service mode.

Mobile Unit Display indicator 240 shows the display character data for the mobile unit 24 associated with it since the telephone display changes to reflect the display of the selected phone. Each mobile unit 24 has its own mobile unit display indicator 240. Each base phone has an associated base phone display unit 242 which is displayed on the screen.

Other selections on hardware screen include branch button 191 which inserts a branch command into a test script. A branch command sends execution of a script to another set of commands. CID fill button 195 is selected to fill in caller ID information. In charge button 21 is an indicator light that is on if the mobile unit 24 is in its charger. Out of charger button 255 is an indicator light that is on if the mobile unit 24 is out of the charger. Recording button 23 is an indicator light that lights when a script is being recorded. Similarly, recording button 261 is an indicator light that lights when the phonebook fill mobile button is selected to fill the phonebook with information.

Figure 10:
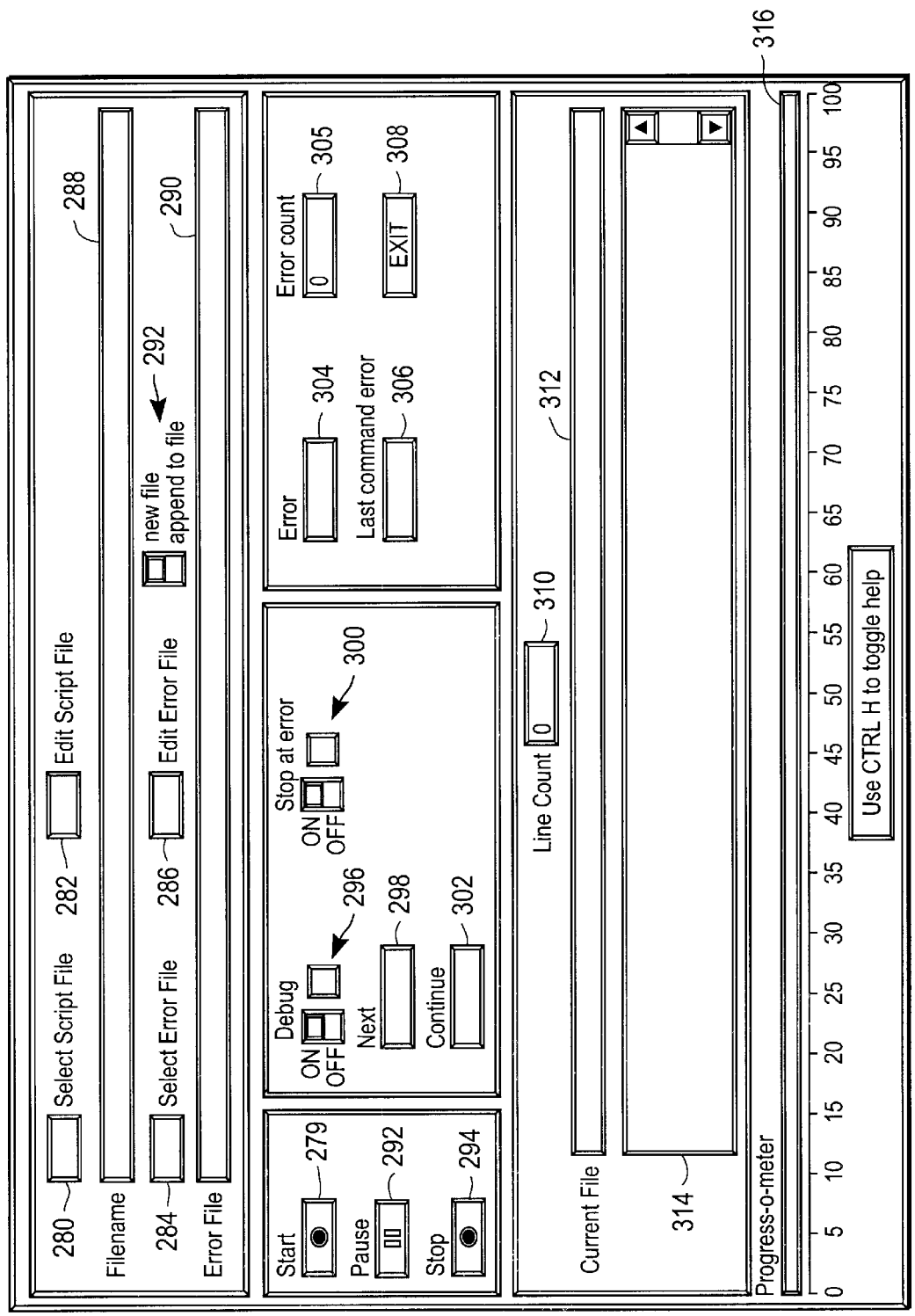
FIG. 10 illustrates an exemplary play screen.

FIG. 10 illustrates an exemplary play display screen in accordance with the teaching of the present invention. Start button 279 plays back actions recorded in a script file 35. Errors that are encountered during playback are then recorded in a separate error file. Some of the important selection options on play display screen include select script file 35 button 280, which is used to select a script file 35 to be executed. Edit script file button 282, invokes an editor to view or edit the current script file 35. Select error file button 284 selects an error file where the errors will be recorded. Edit error file button 286, invokes an editor to view or edit the current test error file. If an error file has already been selected, the editor automatically loads that file for editing. Script file name indicator 288, shows the path and the file name for the current script file 35 while on. Error file name indicator 290 shows the file name and path of a current error file. Also included is new file appended to file control 292. This is used to select whether errors are written into a new file or appended to an old file.

Pause control 292 is used to determine whether or not the script file 35 is to be paused. When paused a pop-up message is displayed indicating that the script is paused. Clearing the pop-up message continues the execution of the script file 35. Stop button 294 terminates execution of the script file 35. Debug button 296 can be set to two choices. If debug is set to "on" the script is stepped through one command at a time manually by the user, selecting next button 298 to execute each successive command. When debug 296 is set to "off" the script file 35 executes each line automatically and continuously. Stop at error command 300 when set to "on" causes the script to terminate at the first error encountered. When set to "off" the script executes to completion even if it hits errors. Next command 298 steps through a script file 35 a step at a time and is associated with the debug command as discussed earlier. Continue button 302 causes script to resume execution from its current position if debug command 296 is set to "off."

Error indicator 304 turns on when at least one error has been found in the current script. Last command error indicator 306 is used to indicate when the previous command causes an error. This is used for debugging. Exit button 308 is used to exit the play function and return to the main menu. Line count indicator 310 shows the total number of lines executed. Current file indicator 312 shows the path and file name of the script file 35 currently being executed. Current file window 314 shows a moving window on the screen of the currently executing file. At the bottom of the screen is progress-o-meter 316 which shows the approximate indication of progress through the current script file 35 in terms of percentage. In one embodiment it is a bar graph which grows as the percentage of the script executed gets larger.

Figure 11:
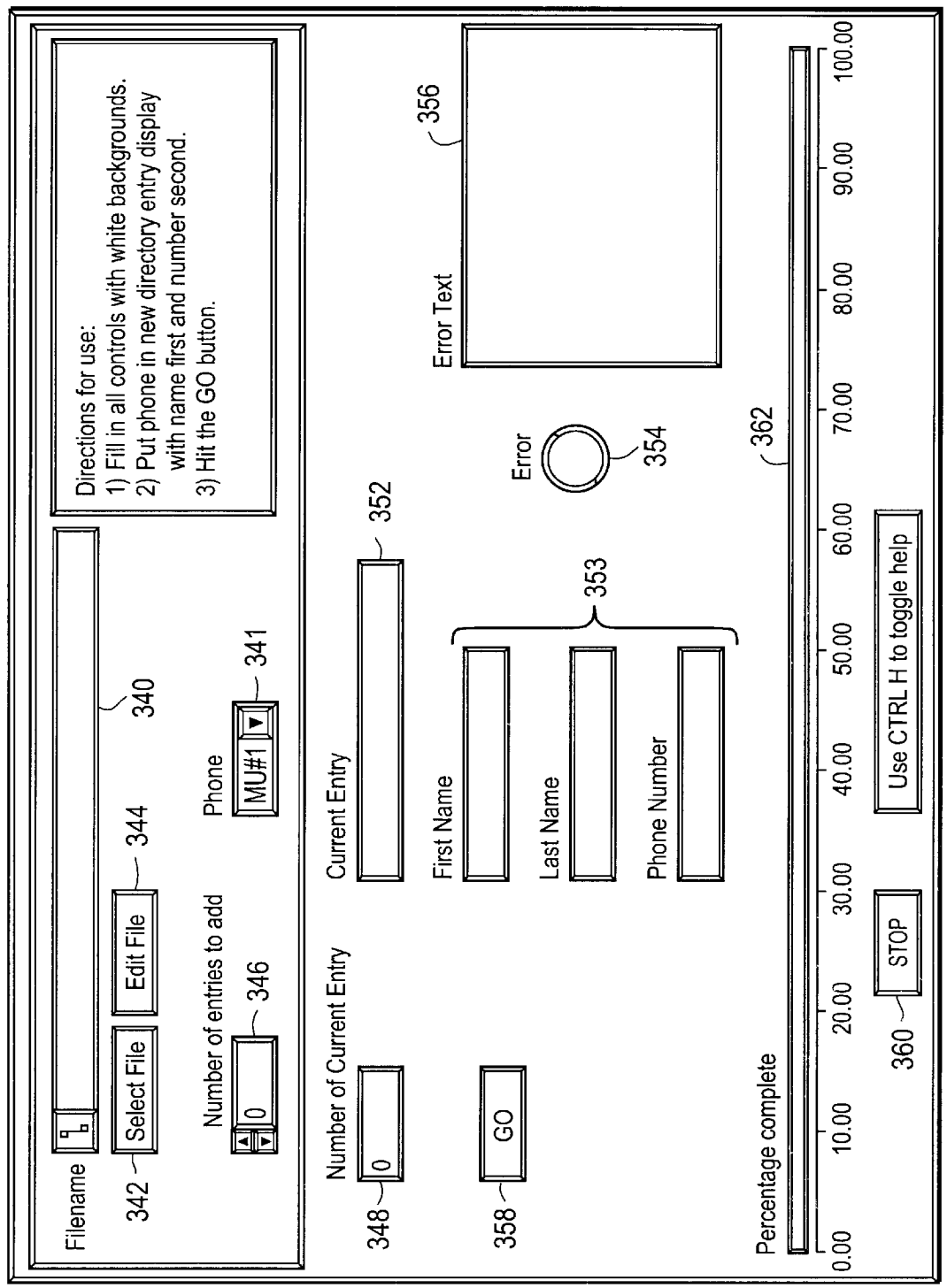
FIG. 11 illustrates an exemplary fill display screen.

FIG. 11 is an exemplary directory fill screen in accordance to teaching of the present invention. Directory fill tool allows a large number of directory entries to be automatically programmed into the mobile or base unit. Directory fill tool reads a list of directory information from a specified files and then performs the key strokes on the base or mobile unit to record this information as a new entry into the directory. Therefore, a large number of entries can be entered automatically without a user having to step through each one. Important indications and commands on this screen include file name indicator 340 which displays the current file in use. Also included is select file button 342 which can be used to select a different file for use for the directory information. Edit file button 344 is used to invoke an editor to edit the file. Number of entries to add button 346 specifies how many entries in the file to program into the phone. The directory fill function starts at the top of the file and adds as many entries as indicated by this control. Select phone button 341 selects which mobile or base phone is to be used.

Number of current entry indicator 348 displays the number of the current entry being programmed. A phone control indicates what phone is being programmed. Current entry indicator 352 indicates what current entry is being programmed. The first name, last name and phone number of the current entry can be entered in blanks 353. Error 354 and error text indicator 356 turns on when an error is detected and the error text shows the description of the error. Go button 358 starts directory fill operation and stop button 360 stops directory fill operation. Also included is a percent complete indicator which indicates the progress of directory fill operation based on the percentage of the number of entries to be added. In one embodiment it is a expanding bar graph which increases in size as the percentage fill increases.

Figure 12:
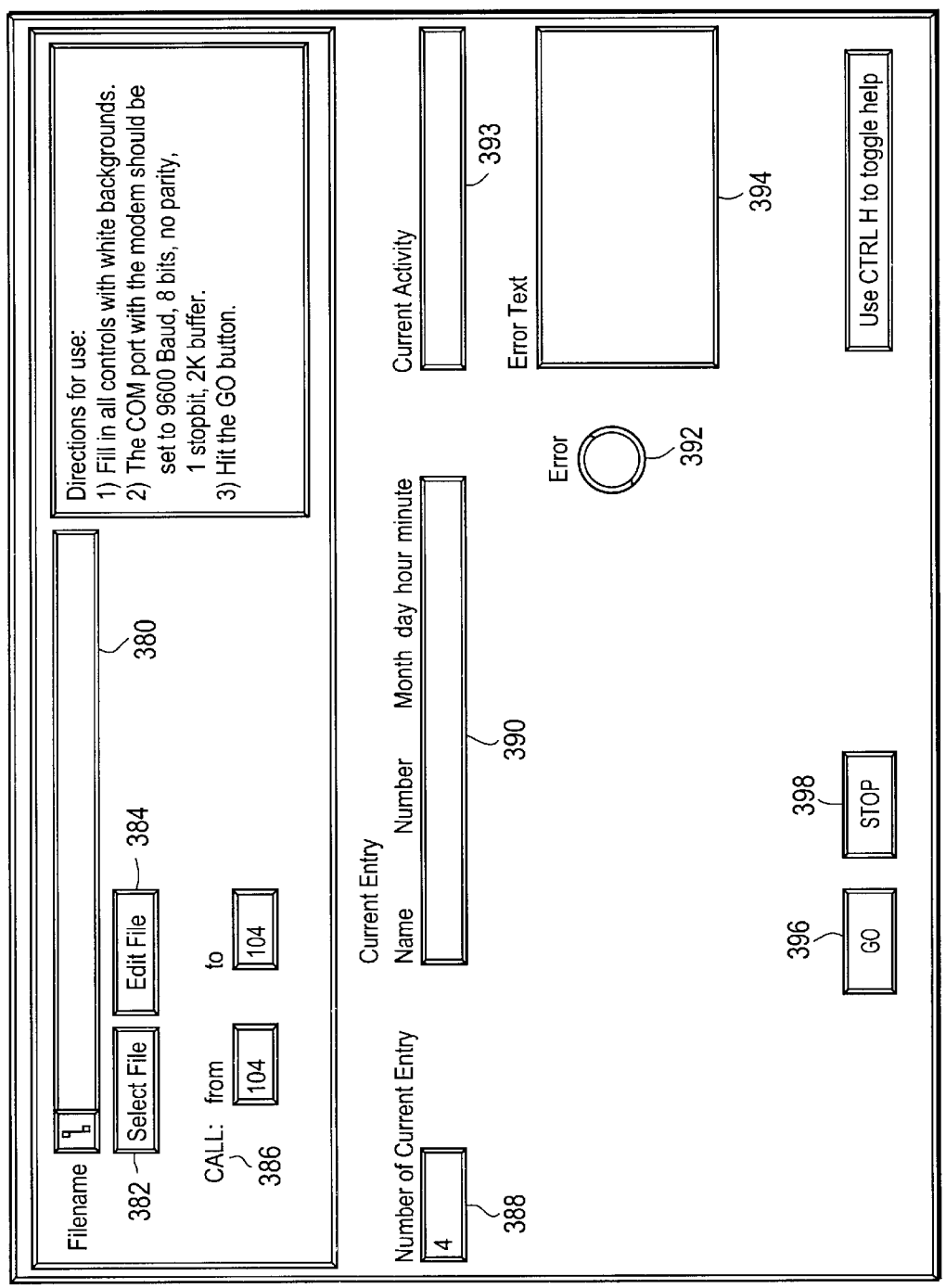
FIG. 12 illustrates an exemplary caller ID fill screen.

FIG. 12 illustrates a caller ID fill tool screen in accordance with teaching of the present invention. The caller ID fill allows a large number of calls to be automatically made with different caller ID information for each call. The caller ID fill tool reads a list of caller ID information from a user specified file, programs the telephone line simulator and then makes a call to the base or mobile unit for each call specified in the file. Some pertinent indicators and buttons on this screen include a file name indicator 380 which displays the current file in use. A select file button 382 is also provided to allow you to select the file that contains the caller ID information. An edit button 384 is used to invoke the editor which can be used to edit the caller ID information. The calls from and to control 386 specifies which lines to make the calls from.

A number of current entry indicators 388 maintains a running count of the number of caller ID calls made, while the current entry indicator 390 shows the current caller ID call that is being programmed into the telephone line simulator. An error 392 on error text indicator 394 is provided to light up when an error is detected and then display that error. A go button 396 starts the caller ID field operation and a stop button 398 stops the caller ID field information.

Figure 13:
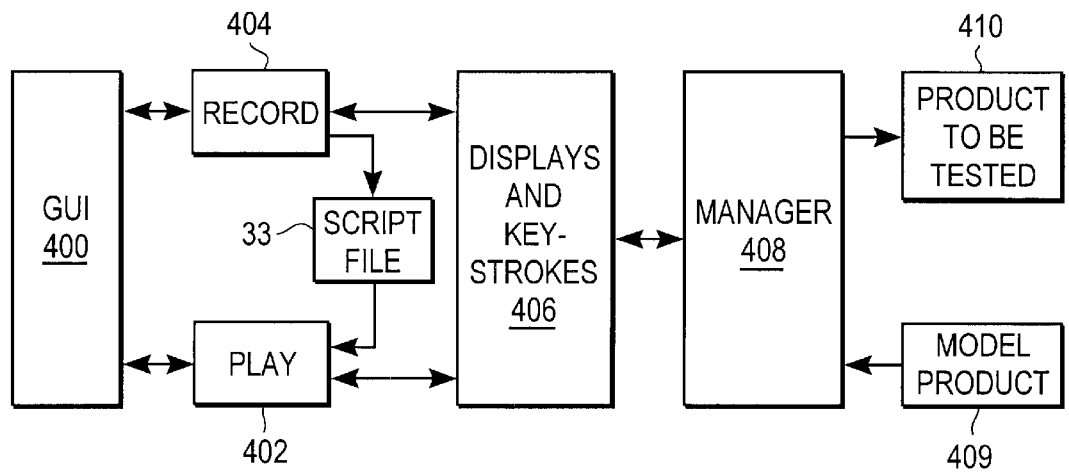
FIG. 13 illustrates an exemplary data flow.

FIG. 13 is a block diagram illustrating an exemplary data flow in accordance with the teachings of the present invention. Illustrated is a graphical user interface 30 of computer 12. GUI 400 cooperates with higher level functions play 402 and record 404. Script files 35 are coupled to the high level functions. The high level functions also operate on global variables 406 which can be for keystrokes (_Press-Key) or for the display (_displays). This is all connected to multimanager 408 which in turns connects to be tested products 409 such as mobile units 24, and base stations 20. Multi-Manager 408 can also be coupled to a model product 410, which, in an embodiment, is also mobile unit 24 and or base station 20.

In order to design CATS independent from the connected phones an independent 'driver' called MultiManager 408 is running parallel to the higher level functions of the present invention. MultiManager 408 consists of managers for the mobile phones 24 (MU-Manager) and managers for the base stations. Their task is to handle the data flow across the RS 232 interface and to the specific devices.

A "HardwareSetup" subroutine defines which manager is responsible for which serial port. The communication port setup is shown in FIGS. 6–7. The link between the higher level functions 'Play' 402 and 'Record' 404 (Play and Record are the names of the interpreter and the script file 35 creating tool and are accessed as shown in FIGS. 9–11) are the global variables "_displays" and "_Press-Key".

"_displays" contains the display data which is sent from the phones. 'MultiManager' 408 fills it. The display data is stored in a two-dimensional array with 10 rows and 17 columns. There is one row for every phone. The first 16 columns (0–15) contain display data and the last column (16) is for handshake. See Table 1.

TABLE 1

|       | Segment 0 | Segment 1 | Segment 2 | . . | Segment 15 | Hand-shake |
|-------|-----------|-----------|-----------|-----|------------|------------|
| Com 0 | !??..??!  | !??..??!  | !??..??!  | . . | !??..??!   | file ready |
| Com 1 | !??..??!  | !??..??!  | !??..??!  | . . | !??..??!   | ready      |
| Com 2 | !??..??!  | !??..??!  | !??..??!  | . . | !??..??!   | ready      |
| . . . | . . .     | . . .     | . . .     | . . | . . .      | . . .      |
| Com 9 | !??..??!  | !??..??!  | !??..??!  | . . | !??..??!   | fill       |

To get the actual display data the higher level functions write "fill" in the corresponding field of "_displays". For instance; if the display data from the telephone at communication port number 0 is requested, the higher level functions writes a "fill" into the field [0, 16]. The MultiManager 408 polls this field and if there is a "fill" in it, they request the display data from the phone and store it in the first 16 fields. When this is finished, a "ready" is written into the handshake field. In this way, the higher level functions know if the manager is busy or if they are allowed to request a display.

"_Press-Key" contains the name of the keys that are pressed when the phone is controlled by the CATS system as seen in FIGS. 9–10. This global variable is one-dimensional array with 10 rows (one for each port). The higher level functions write the name of a key in it to simulate a keystroke. The managers poll this variable and send the corresponding command to the phone. After that, an "empty" is written in the corresponding field. In this case the handshake is performed in the same field which transfers the data. The key command can also be recorded into a script file 35 for playback at a future time. See Table 2.

TABLE 2

| Index | Key Command |
|-------|-------------|
| 0     | Key-1       |
| 1     | Key_2       |
| 2     | empty       |
| . . . | . . .       |
| 9     | Key_star    |

By starting the 'Play' function the user triggers the data flow between script file 35 and 'Play' function. When chosen, an existing script file 35 is run. Thus, in this way 'Play' is acting like a test analyzer. Prerecorded scripts are run, manipulating to be tested products 409 to determine if they pass the test in script file 35. 'Play' function controls the global variables according to the commands in the script file 35. For instance, if the command in the script file 35 is

"PRESS MU#1 KEY_MENU 500"

the 'Play' function checks if the to "MU#1" corresponding comport is available ("empty" in "_Press-Key") and writes "KEY_MENU" in this field.

If the 'Record' function is activated the user controls the global variables and the script file 35. This is used to generate script files. In this way, the system is acting like a test recorder. Every keystroke on the simulated telephone causes an entry into the script file 35 and causes the phone to execute the keystroke. Also the user can request the display by writing "fill" into the handshake field of "_displays". After modifying the display data the user can store this data into the script file 35. Thus, when the script is played, the display data recorded can be compared with display data generated on a to be tested product. Recording test scripts is also discussed in conjunction with FIGS. 8 and 9.

An efficient interpreter needs to have a script file 35 hierarchy (script files can call other script files as a subroutine) and the possibility to debug the written (or recorded) script files (execute step by step). Also, the number of commands has to be updated easily. Since the execution of a script file 35 is like the replay of a 'recorded' script, the interpreter in CATS is called 'Play' function.

To generate a script file 35 hierarchy it is necessary to store the read position after calling another script file 35 on a stack. In CATS this stack is a global variable called "_ScriptList". This is a two-dimensional array. The first column contains the names (physical name and path) of the script files and the second column the read offset in this file.

To verify which script in "_ScriptList" has to be executed the pointer "_LevelCount" points at the current row in "_ScriptList" as shown in Table 3a.

TABLE 3a

|              |   | _Scriptfile |              | Level |
|--------------|---|-------------|--------------|-------|
| _LevelCount  | → | Scriptfile 1| Char offset 0| 1     |
|              |   |             |              | 2     |
|              |   |             |              | 3     |
|              |   |             |              | 4     |

By starting the 'Play' function the name of the highest level script file 35 and a read offset of zero is written in the first row of the global variable "_ScriptList". Also "Level-Count" points on the first level of "_ScriptList". The subroutine "ScriptReader" always reads one line out of the filename, which is stored in the row of "_ScriptList", where "LevelCount" points to with the according offset. This line is passed over to the 'Play' function for further processing. After reading a line out of this file the new read offset is stored in the by "_LevelCount" pointed row of "_ScriptList".

At this point the interpreter doesn't care about the content of the lines, except a "CALL:" as the first word in the read line. If this happens, the parameter after the "CALL:" in combination with the variable "path of subroutines" (modified by the SETPATH command) gets written to the second level of "_ScriptList" (with an offset zero). Also "_LevelCount" is incremented as shown in Table 3b.

TABLE 3b

|  |  | _Scriptfile | | Level |
|---|---|---|---|---|
| _LevelCount | → | Scriptfile 1 | Char offset 45 | 1 |
|  |  | Subscript 1 | Char offset 0 | 2 |
|  |  |  |  | 3 |
|  |  |  |  | 4 |

From this point on "ScriptReader" executes the filename stored in the second level of "_ScriptList". It returns to the next higher level when it hits the end of file (EOF) from the sub-script only by decrementing the global variable "_LevelCount" as illustrated in Table 3c.

TABLE 3c

|  |  | _Scriptlist | | Level |
|---|---|---|---|---|
| _LevelCount | → | Scriptfile 1 | Char offset 45 | 1 |
|  |  | Subscript 1 | Char offset 86 | 2 |
|  |  |  |  | 3 |
|  |  |  |  | 4 |

Now the "ScriptReader" resumes at the higher level script with the according read offset (offset 45 in this example). Before calling a script file 35 the "ScriptReader" checks if the name of the sub-script isn't already on the stack (between level 1 and "_LevelCount"). This is to prevent recursions. Also "LevelCount" can't go beyond 5 to prevent a memory overflow.

Figure 14:
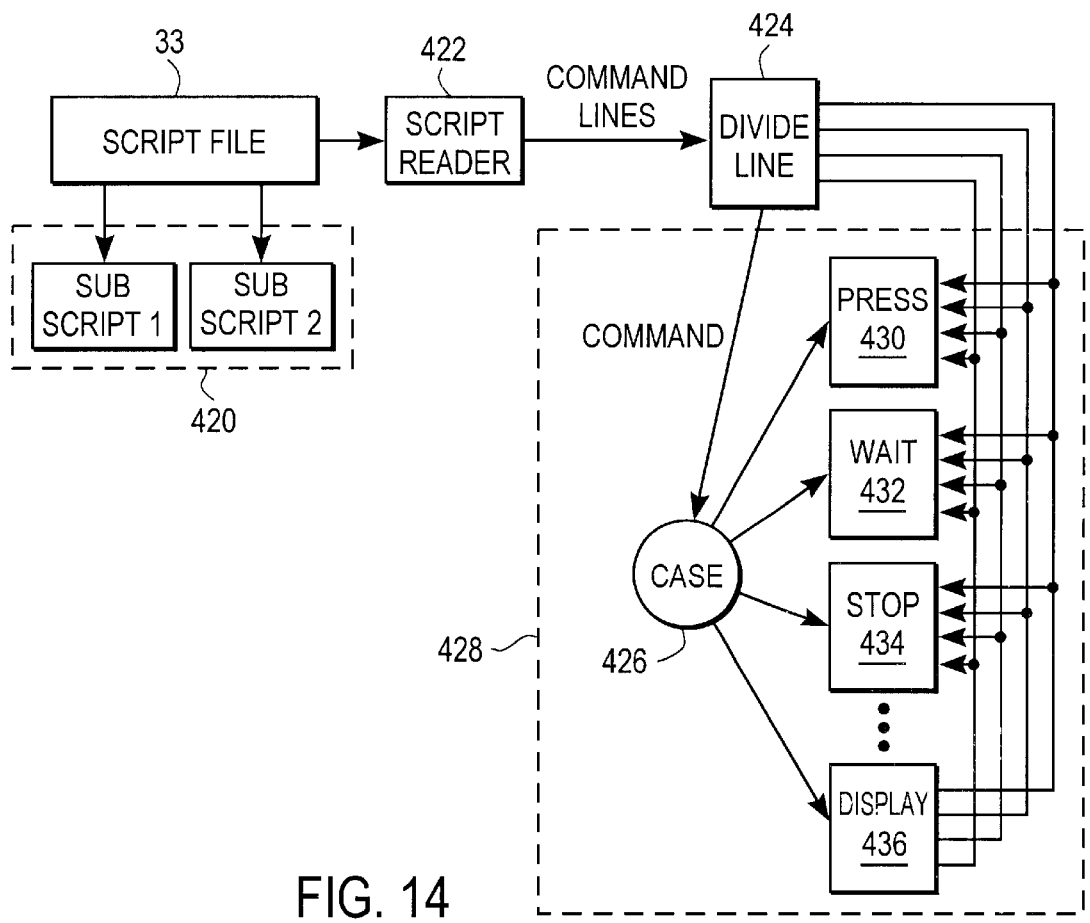
FIG. 14 is a block diagram of the command interpretation.

FIG. 14 illustrates a block diagram of the command interpretation of the present invention. Illustrated is a script file 35 comprising one or more subscript files 420 connected to a ScriptReader 422. ScriptReader 422 takes commands from script file 35 one at a time and passes it to divide line 424 which is like the 'Play' function. At this time the command line is paused. The command itself is first evaluated for case, which is at 426. Then, the proper subroutine 428 is executed using the argument of the command. In the case of the command PRESS MU#1 Key_1 500, the argument MU#1 Key_1 500 will be evaluated at the PRESS subroutine 430.

After ScriptReader 422 passes the read line to the divide line 424, this line gets divided into single strings. Every word separated by it blank becomes a new string and words in-between quote (" ") are stored in one string. The first string is interpreted as a command. It decides which branch of the following case-structure becomes executed. The other strings are parsed to the case structure as parameters for the subroutines that executes the commands. In order to extend the number of possible commands a case structure including the executing subroutine has to be added. The command may vary based on the case.

Figure 15:
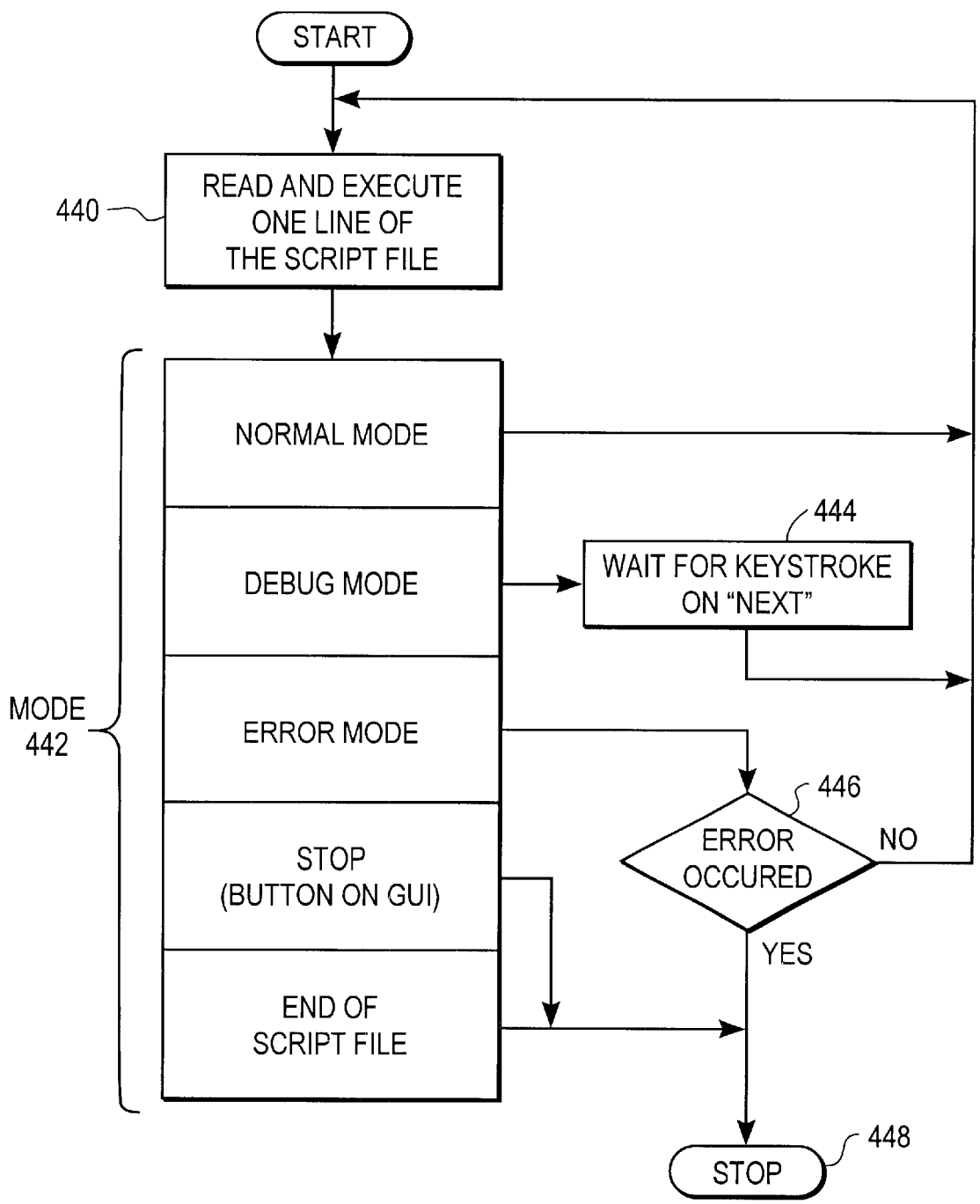
FIG. 15 is a flowchart illustrating the debugging and execution of a script file.

FIG. 15 is a flowchart illustrating the debugging and execution of the present invention. Now that one line of the script file 35 has been read and executed the user can influence how the 'Play' function continues. There are three different modes or case on how to execute a script file 35:

Normal Mode: The 'Play' function resumes without user interaction and stops if the end of the script file 35 is reached.

Error Mode: The 'Play' function stops execution of the script file 35 if an error occurs.

Debug Mode: The 'Play' function pauses after every command and waits for an user interaction before executing the next command.

Thus, in FIG. 15 a line of script file 35 is executed in step 440. Control passes to step 442 where the action depends on the mode. In normal mode, the flow would go back to step 440 to execute the next command. In debug mode, execution of script file 35 stops until "Next" is entered in step 444. Then flow continues in step 440. If in an error mode, it is determined if an error occurred in step 446. If not, execution continues in step 440. If an error occurs, execution stops in 448. If the stop button was pressed on the CATS system execution will stop. Execution also stops if the script file 35 is finished.

It is possible to create script files in two different ways. First an editor may be used to write the sequences of commands into a file. Also, a script file 35 can be generated by recording the actual test being performed on a phone. These two ways are illustrated at FIGS. 8 and 9.

The GUI simulates a telephone on test computer 12. Since different telephones may occur in the test setup, the user can choose between different telephone layouts. Every layout represents the keypad of the chosen phone.

By pressing a button on the simulated phone the 'Record' function simulates a keystroke on the connected phone. Also it creates a script file 35 and adds the command "PRESS" in the correct syntax with all parameters to the script file 35. In addition to this it is possible to capture the display of the phone and edit it. This is necessary for overwriting the time and date in a display with 'jokers' ("?") (A 'joker' is a character in the display-reference of the script file 35, which isn't compared with the original) This is because when running the script at a later date. and time, an error won't be produced due solely to a different time and date. This edited display information can be used as a parameter for the "DISPLAY" command and can be added to the script file 35.

A button for the most popular commands can be placed in the GUI. If the user adds a "CALL:" command, the 'Play' function becomes executed. In this way it's possible to add commands to the script file 35 by only pressing a button.

In a primary embodiment up to ten phones can be connected to test computer 12. It is defined in the syntax that a mobile unit is addressed with "MU#1" through "MU#8", the base station with "BASE" and the external phone with "Rolm".

The "HardwareSetup" function is responsible for assigning a number of a serial port to these names. The user can choose which syntactical name addresses stands for which communication port. The assigning of communication port is illustrated in conjunction with FIG. 6.

This setup-information is stored in the global variable "_hw-setup". This is a one-dimensional array. The syntactical names are stored in this array. The index of this array is equal to the port number.

Since serial port 2 and 3 are missing on a typical personal computer, a two is added to the index if it is more than 1, to get the resulting port number. The translation of the syntactical name to the number of a serial port is solved in the subroutine "NameToPortnumber".

The setup-information is also stored in a file. The name of this file is stored in the file 'SETUP.TXT'. In this way it's possible to 'save' and 'load' different hardware settings in different files. And the user doesn't have to reconfigure the settings every time the program is initiated.

Every serial port needs to be initialized with settings like baud rate and parity. Since the phones connected to this system may change it has to be easy to change these comport settings. The changing of these settings are illustrated in conjunction with FIG. 7.

The 'ComportSetup' function supports editing these settings and saving them in the global variable "_ComInitData" and into a file. The name of this file is stored in the file 'SETUP.TXT'. After quitting this function the comports are initialized with these settings. In this way it's possible to 'save' and 'load' different comport settings in different files. Like in the hardware setup the user doesn't have to reconfigure the settings every time the program is initiated.

To send a command via the RS 232 interface to a connected phone the data format of the send data must be correct.

The mobile unit is connected to the serial port of the PC via an PC-converter. To send a valid command, the protocol has to be correct. The following is a list of important settings and formats:

Byte format
_19200 baud
_8data bits
_1stop bit
_no parity

Data block format:
STX, record-counter/error-flags, data1, data2, . . . ,ETX
A preceding DLE is added to controlling codes like STX (start text) and ETX (end text). It indicates that the following byte is a data byte and no control byte.

Controlling codes
STX: $02 indicates start of data block
ETX: $03 indicates start of data block
DLE: $10 indicates that the following byte is a data byte Although the present invention has been described in detail, it should be understood that various changes, substitutions , and alterations can be made hereto without departing from the spirit and scope of the present invention as defined by the following claims. Indeed, while an embodiment involving testing phones has been described in detail, the use of this system to test other devices that require a man-machine interface would be obvious to one of skill in the art.

What is claimed is:

1. A system for automated testing of an electronic device, comprising:
a test recorder coupled to a model product during an original test via a communication link, the test recorder operable to generate and store a test record of an original test while the original test is performed, the test record comprising:
a manipulation entry representing an original manipulation signal, and
a model response entry representing an original response signal; and
a test analyzer operable to play the test record, the test analyzer coupled to a to-be-tested product via a test link such that when the test analyzer plays the test record, the to-be-tested product:
receives a test signal that simulates on the to-be-tested product the original manipulation signal of the original test;
generates a test response signal representing a result of the test signal; and
communicates the test response signal to the test analyzer, the test analyzer operable to compare the test response signal against the model response entry and to identify a test response that differs from the model response entry.

2. The system of claim 1, wherein:
the model product is an emulation of one of a plurality of model product; the emulation displaying a virtual representation of the model product on the test recorder, the emulation operable to allow a user to manipulate the virtual representation to generate and store a test script.

3. The system of claim 1, wherein the test analyzer comprises an operator interface allowing a user to pause play and to stop play of the test record when the test analyzer identifies a test response that differs from the model response entry.

4. The system of claim 1, wherein the test recorder allows a user to edit the test record.

5. The system of claim 1, wherein the test record is generated as a text document script file.

6. The system of claim 1, wherein the model product is a mobile telephone unit.

7. The system of claim 6, wherein the test link comprises an RS232 to I²C converter.

8. The system of claim 1, wherein the test link is operable to couple the test analyzer to a plurality of to-be-tested products.

9. The system of claim 1, wherein the test analyzer is further operable to automatically repeat a test record a plurality of times.

10. The system of claim 6, wherein:
the model product can record a voice mail message; and,
the manipulation comprises leaving an audible message comprising a coded series of dual tone multiple function tones.

11. The system of claim 1, wherein the test analyzer and test recorder are provided together as a single test computer.

12. A method for automated testing of electronic devices, comprising:
running a product test, the product test comprising a manipulation of a model product to invoke a model response;
communicating electronically a manipulation signal generated by the model product when manipulated during the product test and a response signal generated by the model product when responding to the manipulation of the product test to a test recorder, the test recorder operable to record the manipulation signal and the response signal into a test record while the product test is being run;
coupling a to-be-tested product to a test analyzer;
playing the test record with the test analyzer such that the to-be-tested product receives a test signal that simulates the manipulation of the product test on the to-be-tested product, the test signal inducing a test response from the to-be-tested product;

communicating the test response to the test analyzer, the test analyzer operable to compare the test response against the model response, the test analyzer further operable to identify a test response that differs from the model response.

13. The method of claim 12, wherein running the product test comprises the manipulation of a virtual product which emulates a plurality of actual product functions, the virtual product operable to accept the manipulation through a user interface system, the virtual product further operable to generate a model response to the manipulation.

14. The method of claim 12, further comprising the step of allowing a user to pause play and to stop play of the test record when the test analyzer identifies a test response that differs from the model response.

15. The method of claim 12, further comprising the step of allowing the test record to be edited.

16. The method of claim 12, wherein the test record is generated as a text document script file.

17. The method of claim 12, wherein the model product and the to-be-tested product are mobile telephone units.

18. The method of claim 17, wherein the to-be-tested product is coupled to the test player via an RS232 to $I^2C$ converter.

19. The method of claim 12, further comprising the step of coupling the test analyzer to a plurality of additional to-be-tested products.

20. The method of claim 11, further comprising the step of replaying the test record a plurality of times.

21. The method of claim 16, wherein:

the model product can record a voice mail message; and, the manipulation comprises leaving an audible message comprising a coded series of dual tone multiple function tones.

22. The method of claim 12, wherein the test analyzer and test recorder are provided as a test computer.

* * * * *